Oct. 21, 1924.                F. W. GROBY                1,512,685
                            ACCOUNTING SHEET
                            Filed Aug. 6, 1919            2 Sheets-Sheet 1

Inventor
Frederick W. Groby
By his Attorney

Oct. 21, 1924.
F. W. GROBY
1,512,685
ACCOUNTING SHEET
Filed Aug. 6, 1919
2 Sheets-Sheet 2
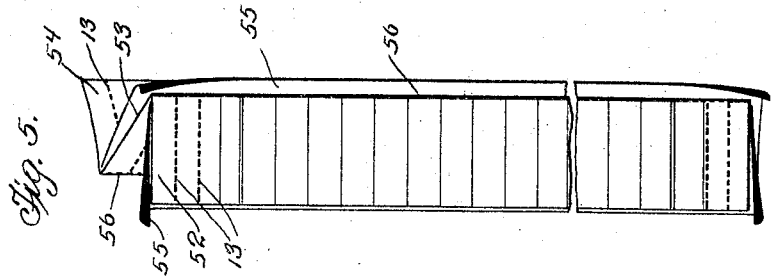
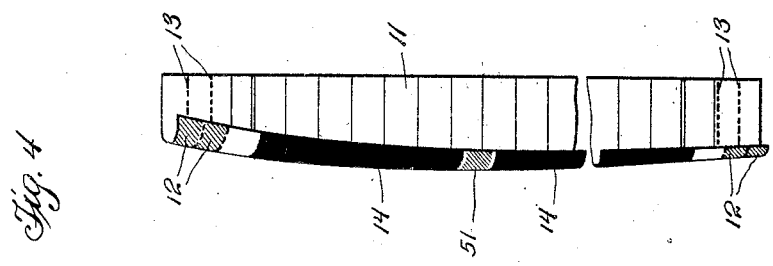
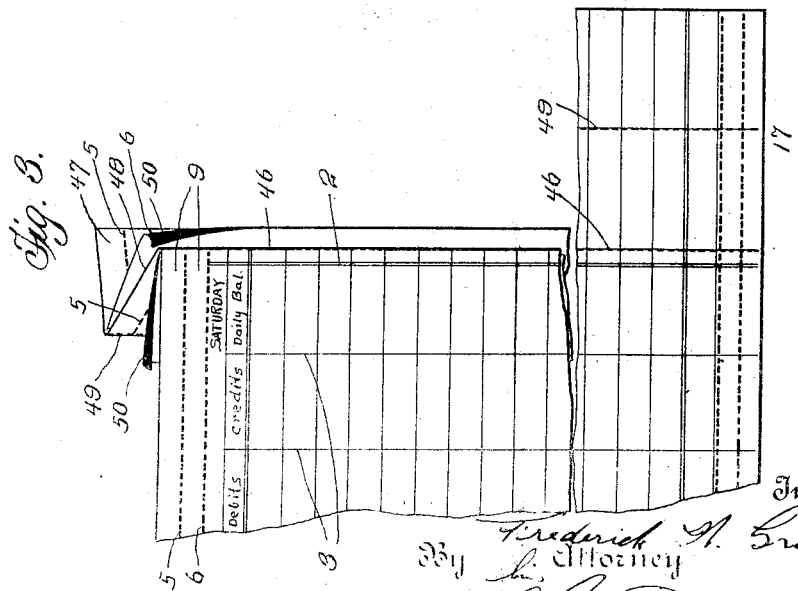

Patented Oct. 21, 1924.

1,512,685

UNITED STATES PATENT OFFICE.

FREDERICK W. GROBY, OF RIVER EDGE, NEW JERSEY.

ACCOUNTING SHEET.

Application filed August 6, 1919. Serial No. 315,601.

*To all whom it may concern:*

Be it known that I, FREDERICK W. GROBY, residing at River Edge, in the county of Bergen and State of New Jersey, have invented certain new and useful Improvements in Accounting Sheets, of which the following is a specification.

This invention relates to an accounting device and particularly to what is familiarly known to accountants as a safeguard ledger, the present invention being an improvement over what is shown and described in my pending applications Serial Nos. 264,169, filed Nov. 26, 1918, Patent No. 1,461,757, and 279,679, filed Feb. 28, 1919.

The object of the present invention is to provide an accounting sheet embodying further improvements and conveniences beyond those shown in said pending applications, and at the same time one which is considerably simplified both in its construction and mode of use, the sheet of this invention, like those of the previous inventions, being adapted to enable all of the calculations, etc., which are to appear thereon to be performed by mechanical typewriting and calculating machines.

A further object is to provide sheets adapted for use in pairs, one bearing the record for Monday, Tuesday and Wednesday, and the other bearing the record for Thursday, Friday and Saturday, of each week, the features of the sheets being of such a character that balances may be readily transferred from one sheet to another, or from one side to the other of the same sheet, without necessity for re-writing the balances, to the end that the sheets may be used day after day, and week after week without necessity at any time of rewriting the balances in order to transfer them from place to place.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown merely a preferred form of embodiment of the invention:—

Figure 1 is a plan view of a sheet having its features arranged in accordance with this invention, to cover a period including Monday, Tuesday and Wednesday of a week.

Figure 2 is a similar view of a second sheet to cover a period including Thursday, Friday and Saturday of a week.

Figure 3 is a detail perspective view illustrating a modification of the parts shown at the right hand end of Fig. 2.

Figure 4 is a detail perspective view of a separately formed record strip which may be employed in connection with this invention, and Figure 5 is a detail view of the record strip similar to that shown in Fig. 4 but illustrating a modification.

The sheets comprising this invention, are, of course, intended to be used upon both their surfaces, and it may be here mentioned that the ruling and captions appearing in Fig. 1 of the drawings are illustrative of what appears upon the reverse side of the sheet Fig. 2, and that likewise, the ruling and captions appearing in Fig. 2 of the drawings are illustrative of what appears upon the reverse side of the sheet, Fig. 1.

For illustrative purposes, the sheets shown in the present drawings, and herein described, like those described in said pending applications, are such as would be used in a bank, or the like, for calculating the various depositors' balances from day to day and from week to week. As before, however, it will be apparent that the principles of this invention may be as readily applied to any other type of sheet, according as requirements may dictate and that the only essential differences would probably be the differences in the captions used, or in the substitution of named commodities, or articles, etc., instead of personal or company names, as herein given.

Referring to the drawings for describing in detail the structure which is illustrated therein, the reference character L indicates one of the sheets while the reference character G indicates the second sheet. Upon each of these sheets is ruled a series of horizontal lines spaced apart to define a plurality of spaces, the spaces being numbered, as indicated at 1. Of course the vertical length of the sheet may be such as to include any desired number of these spaces.

A series of relatively conspicuous vertical lines 2 is provided to divide the sheet horizontally into sections, one for each day of the week, which sections may be conveniently referred to as "daily sections", and the several sections being captioned "Monday", "Tuesday" and "Wednesday", etc.

Each of these "daily sections" is preferably divided by vertical lines 3 dividing them into three columns, one captioned "Debits", the second captioned "Credits" and the third captioned "Daily balance".

Adjacent the left hand margin of each sheet is provided a name column 4 within which are printed names, as "Anders", "Angel & Co.", and "Anis & Co.", etc., said names being placed in the spaces defined by the horizontal lines.

Detachable "pick-up" strips, as H, are provided for use as will presently be described.

These strips are similar to those employed in connection with the applications above mentioned, and are preferably formed separate from the main sheets.

Each of the sheets L and G is also provided with two lines of perforations, as 5 and 6, horizontally along its upper margin, and two similar lines of perforations, as 7 and 8, horizontally along its lower margin, as heretofore, said lines of perforations defining easily removable strips 9 to which the "pick-up" strips are adapted to be attached, the strips 9 being intended to be removed, if desired, after the sheet is completed. In this way the defacement occasioned by the attaching and removing of the "pick-up" strips is not present upon the finished sheet.

The "pick-up" strips are suitably gummed, as at 10, at their upper and lower ends so that they may be readily attached to the strips 9 regardless of which side of the "pick-up" strip is used.

In addition to the "pick-up" strips, other removable strips, as 11, are provided, one for each pair of sheets L and G. The strips 11 are similar in general outline to the "pick-up" strips and they are placed over the "Daily balance" column for the section "Wednesday" of the sheet L. They are provided with gummed surfaced portions 12 at their opposite ends by which they may be attached to the main sheet, that is, preferably to the strips 9. They are also provided with lines of perforations 13 positioned to correspond with the lines 5, 6, 7 and 8.

These strips 11 are carbonized upon their reverse side, as at 14, so that the matter printed upon the upper surface is duplicated on the main sheet, thus making two copies of the balance for Wednesday, one copy; that is, the original copy upon the strip 11, being adapted to be torn off and transferred to the sheet G, as indicated at 16 in Fig. 2.

A similar carbonized strip may be used when writing the daily balance for Saturday upon sheet G, if desired, so that the original copy may be transferred to a succeeding sheet for the following Monday. As illustrated, however, the sheet G is shown to have a portion 17 constituting a column beyond the "Daily balance" column for the "Saturday" section, said portion being adapted to be folded back behind the "Daily balance" column. By placing a sheet of ordinary carbon paper, as 18, within the fold the balances, as printed in the "Daily balance" column of "Saturday", may be duplicated upon the folded back portion and thus appear upon the reverse side of the sheet, which side of the sheet, as above suggested, is ruled and captioned, as shown for sheet L; hence, the daily balances for Saturday will appear in a column, as 19, for the following week.

Of course the portion 17 may be folded over in front of the Saturday "Daily balance" column, if desired, the carbon 18 being placed within the fold as before. In this instance, the reverse side of the sheet would bear the original, and the Saturday "Daily balance" column would bear the carbon copy of the Saturday balances.

If desired, the use of strips 18 of ordinary carbon paper may be dispensed with and strips, such as those indicated at 11, may be utilized instead in the same manner.

Also, if desired, the portion 17 may be suitably gummed if such a resort is found necessary for holding the portion 17 folded during the writing in of the balances. For this purpose the portion 17 may have a gummed surface part, as at 45, the gum being applied to either, or both surfaces of the part 45 so that it may be utilized in accordance with whether the portion 17 is folded forwardly or backwardly.

All of the "pick-up" strips, and the strips 11, are suitably ruled to correspond with the portions of the main sheet which they overlie.

In use, the sheet is placed in a typewriting, or calculating machine, in the usual manner, the names of the depositors, if not previously printed, being written into the column 4. The balances from the previous Saturday appear in the column 19, as above described.

In the name space, numbered 1, in the drawing, Fig. 1, the depositor's name is "Anders," and the balance to his credit brought over from the previous Saturday night, as shown in the column 19, is $100.00.

Deposits and withdrawals are now noted and balances struck.

In the space numbered 1 in the drawing, Fig. 1, the amount withdrawn by Anders, as shown in the "Debits" column of the "Monday" section, is $25.00.

In order that the calculating machine, in which this sheet is adapted for use, may be made to compute the difference between Mr. Anders' previous balance of $100. and the present withdrawal of $25., the amount of the balance must necessarily be first written somewhere by the machine in order to enable the mechanical calculating devices of the machine to properly register the amount. This writing of the balance is compulsory, and yet the figures thus written have no particular significance or place upon the sheet. Hence, the value of the removable strips H to receive them.

This writing of the balance is familiarly known as "picking-up" the balance, and from this fact the strips H are properly termed "pick-up" strips.

Accordingly, the "pick-up" strip H is laid over the surface of the sheet just to the right of the column 19, and the amount of the balance, $100., is picked-up thereon, as at 20. The carriage of the machine is then shifted, and the amount of the withdrawal, $25., is written in the "Debits" column, as at 21. The printing of the amount of the withdrawal automatically registers in the indicator of the machine, and the machine impresses the difference; that is, the balance, which is $75., in the "Daily balance" column, as at 22.

Subsequently, as shown in the drawing, the depositor Anders makes a deposit of $100. and a withdrawal of $30.

The operator, at the close of businesss for Monday, desiring to compute Anders' balance to be carried over to Tuesday, picks-up upon the strip H the amount of the former balance, $75., as at 23. He then shifts the carriage of the machine and writes the two amounts, $30. and $100., in the "Debits" and "Credits" columns, as at 24 and 25, respectively. The machine thereupon impresses the new balance, $145.00, as at 26, in the "Daily balance" column.

This process is proceeded with relative to each of the depositors in the column 4 and for each day of the week, according to the number of depositors and the various deposits and withdrawals by each on the respective days.

At the conclusion of business for Monday, the first "pick-up" strip H may be removed, leaving the space beneath it entirely clean and clear for memoranda, etc., as desired.

On Tuesday, the depositor Anders made a withdrawal of $50. The operator places a "pick-up" strip over the "Credits" column of the section "Monday," picks-up thereon the Monday's balance of $145., writes into the "Debits" column of the section "Tuesday," as at 27, the amount of the withdrawal, and the machine prints the balance, $95., in the "Daily balance" column of Tuesday, as at 28.

On Wednesday, the depositor Anders made a deposit of $100. The operator pastes a "pick-up" strip over the "Credits" column of the section "Tuesday," picks-up thereon, as at 29, the Tuesday balance, $95., writes into the "Credits" column of Wednesday, as at 30, the amount of the deposit, and the machine prints the new balance, $195, as at 31, in the "Daily balance" column of Wednesday, in this instance the balance being printed upon the surface of the carbonized strip 11, the carbon copy of the printing being made to appear upon the main sheet.

This surface of the sheet L is now completed.

The strip 11, bearing the balance $195., together, of course, with the balances for all of the other depositors appearing in the column 4 of the sheet, is torn off and transferred to sheet G, as above described.

On Thursday, the depositor Anders made a deposit of $5. The operator places a "pick-up" strip H over the column adjacent the strip 11 and picks-up thereon, as at 33, the Wednesday balance of $195. He then writes the amount of the deposit in the "Credits" column of the "Thursday" section, as at 34, and the machine prints the new balance of $200. in the "Daily balance" column of Thursday, as at 35.

On Friday, the depositor Anders made a deposit of $600. and a withdrawal of $100. The operator pastes a "pick-up" strip over the "Credits" column of the "Thursday" section, picks-up thereon the Thursday balance of $200., and writes in the "Debits" and "Credits" columns the amount of the withdrawal and deposit, as at 36 and 37 respectively. The machine prints the new balance, $700., in Friday's "Daily balance" column, as at 38.

Later in the same day, the depositor Anders made a withdrawal of $200. The operator picks-up the balance $700. upon the last mentioned "pick-up" strip, writes the withdrawal in the "Debits" column, as at 39, and the machine prints the new balance, $500., in the "Daily balance" column of Friday, as at 40.

On Saturday, the depositor Anders made a withdrawal of $400. The operator places a "pick-up" strip over the "Credits" column of the "Friday" section, and picks-up thereon, as at 41, the amount of Friday's balance, $500. He then writes down the amount of the withdrawal, $400., in the "Debits" column of the "Saturday" section, as at 42. The machine then writes down the new balance, $100., in the "Daily balance" column of Saturday, as at 43.

In writing the $100. in Saturday's "Daily balance" column, the operator folds the sheet and uses the carbon 18, as above suggested, and thus transfers on to the reverse side of the sheet the amount $100., which, when the sheet is inspected from its reverse side, appears as seen at 44 in Fig. 1.

Of course, when printing the amount $100. into the "Daily balance" column of Saturday, the operator may use a strip as that indicated at 11 in Fig. 1, and then transfer the strip to the reverse side of the sheet, if he so desires, instead of folding over the portion 17 of the sheet.

After the sheets are used upon both of their surfaces, in the manner as thus described, and all of the separable marginal strips 9 and all of the "pick-up" strips and strips 11 have been removed, as desired, the sheets may be conveniently bound in a suitable binder by means of the binder apertures or the like, as 32, it being noted that the binder apertures 32 are carried in portions of the sheet which serve for the attachment of the strips 11 when said strips are transferred from one sheet to another, as indicated at 16 in Fig. 2.

Here it should be noted that some operators may prefer to transpose the position of the strip 11 and the adjacent "pick-up" strip H, as seen in Fig. 2. This, of course, would not alter the spirit of this invention in any way.

As has been above suggested, the strip of carbon paper 18, which is utilized for transferring the Saturday balance to the opposite side of the sheet, might be dispensed with, and in lieu thereof the surface of the sheet itself may be carbonized. In this connection it will be noted that if the upper surface of the portion 17 of the sheet is carbonized, and said portion 17 be folded over upon the Saturday "Daily balance" column, any writing upon the then upper surface of the portion 17 will be impressed in carbon copy in the Saturday "Daily balance" column, and the original will appear on the reverse side of the sheet when the portion 17 is unfolded. In instances where such carbonizing of the surface of the sheet is employed, it is preferable that the portions bearing the carbon shall be detachable. The portion 17 may be made detachable from the main sheet, therefore, by making the line of the fold, as at 46, perforated.

As illustrated in Fig. 3, it is within the scope of this invention also to make the portion 17 in such proportion as to be capable of being folded over a plurality of times, as indicated at 47 and 48. The different folds may be connected to the main sheet and to each other by lines of perforations, as at 46 and 49, and strips of carbon paper, as 50, may be placed between the folds so that in writing the Saturday "Daily balance" a plurality of carbon copies will be produced each upon separate strips which may be readily detached, for instance, to be sent to different departments of a business house, or to other different points.

Obviously also the carbon paper 50 may be displaced by carbonizing one surface of each of the folds after the manner just referred to.

In Fig. 4 is illustrated one of the detachable strips 11, and it will be noted that this strip has its carboned surface 14 separated by a non-carboned portion 51, which portion 51 is gummed similarly as are the ends of the strip. The strip may be provided with more than one of the portions 51 along its length, if desired, and they are intended to be used for conveniently attaching the intermediate portions of the strip to the main sheet whenever desired.

In Fig. 5 is illustrated a modification of the strip of Fig. 4, the modification consisting in making the strip to consist of a plurality of folds, as 52, 53 and 54. One surface of each of the folds may be carbonized in the manner as shown in Fig. 4, or separate strips of carbon paper, as 55, may be employed, so that whenever a record is made upon one of these strips, several copies will be furnished.

The different folds are connected by lines of perforations, as at 56, so that they may be readily separated. Each of the folds may also be gummed both at the ends and in the middle, the same as is shown in Fig. 4, so that the folds may be stuck together and so that the strip may be attached to the sheet. The ends of the strip may also be perforated, the same as the strip of Fig. 4, to facilitate detachment from the main sheet.

Strips as are shown in Figs. 4 and 5 may obviously be employed for overlying any column of any sheet, whenever it is desired to make duplicate copies of the figures to appear in said column.

It may be here noted also that the strips of Figures 4 and 5 may be made of sufficient width to cover more than one column, if preferred.

It will be seen that in transferring the balances from one sheet to another, or from one surface to the opposite surface of the same sheet, carbon copies of the balances are provided for, all properly positioned, so that there is no possibility of error in the transferring, and this process may be continued indefinitely from sheet to sheet without at any time requiring the figures to be rewritten for transfer. This is a very essential feature of the present invention and materially improves the safety and general reliability of the record produced. One or more copies of any part or parts of the record may also be conveniently obtained. At the same time all of the features are so correlated and arranged as to enable the sheet to be operated upon with entire ease and simplicity by an ordinary calculating machine.

As many changes could be made in this construction without departing from the scope of the invention as defined in the following claims, it is intended that all matter contained in the above description, or shown in the accompanying drawings, shall be interpreted as illustrative only and not in a limiting sense.

Having thus described my invention, what I claim as new and desire to secure by Letters Patent is:—

1. In an accounting sheet, or the like, such as is adapted to be used successively with others for the keeping of records from day to day, means whereby the balances, as computed in the record on each sheet, may be transferred to succeeding sheets indefinitely without requiring rewriting of the balances for effecting the transfer.

2. A sheet of the class described suitably ruled and captioned to provide columns for the keeping of records from day to day, a carbonized strip overlying one of said columns adapted to have the record for that column written thereupon for impressing a carbon copy of the writing upon the sheet in said mentioned column, means for retaining said strip in position upon the sheet, and said means being of a character to render said strip easily detachable.

3. A sheet of the class described suitably ruled and captioned to provide columns for the keeping of records from day to day, a carbonized strip overlying one of said columns adapted to have the record for that column written thereupon for impressing a carbon copy of the writing upon the sheet in said mentioned column, the sheet having a detachable portion provided thereon, and means for connecting said strip to said detachable portion of the sheet whereby to render the strip also detachable.

4. A sheet of the class described suitably ruled and captioned to provide columns for the keeping of records from day to day, a carbonized strip overlying one of said columns adapted to have the record for that column written thereupon for impressing a carbon copy of the writing upon the sheet in said mentioned column, and said strip being of a character to provide a plurality of copies of said writing.

5. A sheet of the class described suitably ruled and captioned to provide columns for the keeping of records from day to day, and a member overlying one of said columns adapted to have the record for that column written thereupon, said member being of a character to produce a plurality of copies of the record written thereon and to cause one of said copies to be impressed directly upon said sheet.

6. A sheet of the class described suitably ruled and captioned to provide columns for the keeping of records from day to day, and a portion of said sheet containing the last column being adapted to be folded backwardly behind the main portion of the sheet so as to underlie the next to the last column, together with a strip of carbonized material to be disposed within the fold so that the writing of a record within said next to last column will produce a copy of the writing upon the reverse surface of the sheet.

7. A sheet of the class described suitably ruled and captioned to provide columns for the keeping of records from day to day, and a portion of said sheet being folded for producing a plurality of thicknesses of said sheet lapping one of said columns, together with means whereby the writing of the record within said column will produce a copy of said writing upon each of said folds.

8. A pair of sheets of the class described suitably ruled and captioned one to provide separate sections for Monday, Tuesday and Wednesday of a week, and the other to provide similar sections for Thursday, Friday and Saturday of the same week, the reverse surface of the second sheet being similarly ruled and captioned to provide separate sections for Monday, Tuesday and Wednesday of the succeeding week, in combination with means whereby the record at the end of the first sheet may be written in duplicate to provide a copy for attachment to the second sheet, and other means whereby the record at the end of the second sheet may be duplicated during its writing directly upon the reverse surface of said second sheet.

9. A pair of sheets of the class described suitably ruled and captioned one to provide separate sections for Monday, Tuesday and Wednesday of a week, and the other to provide similar sections for Thursday, Friday and Saturday of the same week, the reverse surface of the second sheet being similarly ruled and captioned to provide separate sections for Monday, Tuesday and Wednesday of the succeeding week, a detachable record carrier carried by the first sheet to receive the summary of the record of the first sheet thereon and being adapted to be detached and transferred to the second sheet, and the second sheet having a binder attaching portion thereon to which said record carrier may be attached.

10. A pair of sheets of the class described suitably ruled and captioned one to provide separate sections for Monday, Tuesday and Wednesday of a week, and the other to provide similar sections for Thursday, Friday and Saturday of the same week, the reverse surface of the second sheet being similarly ruled and captioned to provide separate sections Monday, Tuesday and Wednesday of the succeeding week, in combination with means whereby the writing of a record at the end of the second sheet will produce a copy of said record at the beginning of the Monday section upon the reverse surface of said second sheet.

11. A record strip adapted for attachment to a sheet of the class described, said record strip having gummed portions at its opposite ends, having a further gummed portion intermediate its ends, all on one surface of said strip, and said surface intermediate said gummed portions being carbonized.

12. A sheet of the class described suitably ruled and captioned to provide columns for the keeping of records, a pick-up strip, means by which said pick-up trip is detachably connected with said sheet, and said pick-up strip consisting of a plurality of layers separably connected together and having means whereby a record impressed upon one of said layers will also be correctly readably impressed upon all of the other layers and upon said sheet.

13. The combination with a suitable sheet, of a record strip consisting of a plurality of layers separably connected together having means whereby a record impressed upon one of said layers will also be correctly readably impressed upon other layers, means whereby said strip may be detachably connected with the sheet, and said strip also having means whereby a record impressed upon one of its layers will be correctly readably impressed upon the sheet.

In testimony whereof I affix my signature in the presence of two witnesses.

FREDERICK W. GROBY.

Witnesses:
L. GESSFORD HANDY,
S. J. AUMILLER.